Feb. 15, 1966    H. ORNER    3,234,810
PRELOADED BALL BEARING SCREW AND NUT MECHANISM
Original Filed Feb. 24, 1961
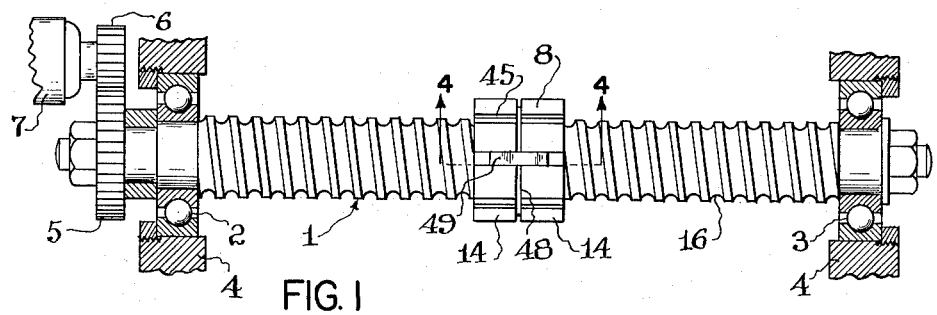
FIG. 1
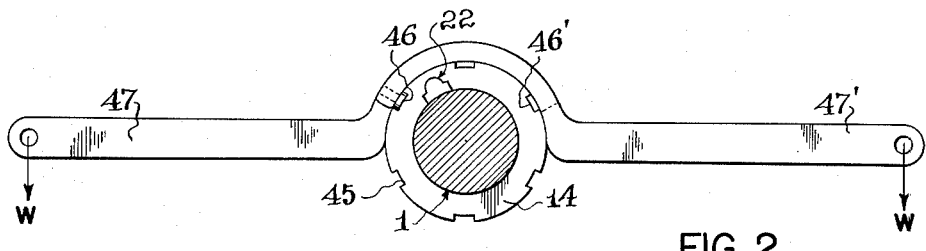
FIG. 2
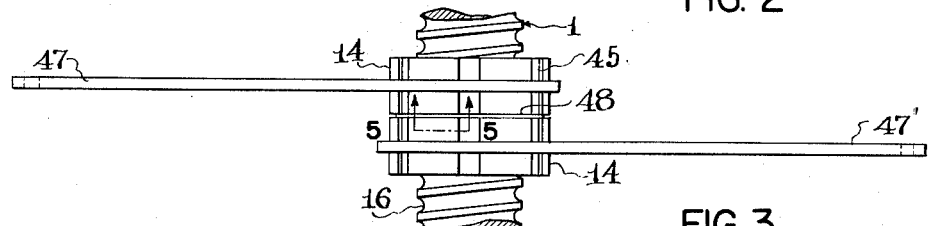
FIG. 3
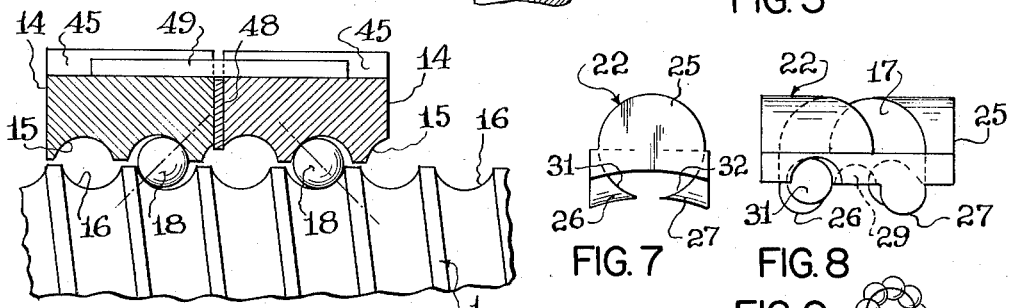
FIG. 4   FIG. 7   FIG. 8   FIG. 9
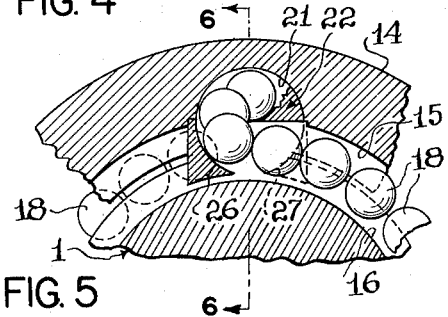
FIG. 5
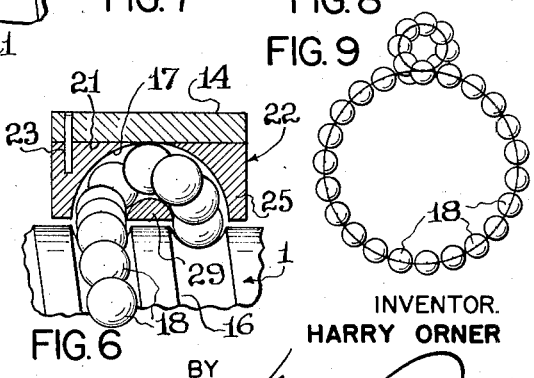
FIG. 6
INVENTOR.
HARRY ORNER
BY
ATTORNEY.

United States Patent Office 3,234,810
Patented Feb. 15, 1966

3,234,810
PRELOADED BALL BEARING SCREW AND NUT MECHANISM
Harry Orner, 2479 Glen Canyon Road, Altadena, Calif.
Original application Feb. 24, 1961, Ser. No. 91,545, now Patent No. 3,198,029, dated Aug. 3, 1965. Divided and this application Dec. 23, 1963, Ser. No. 332,513
13 Claims. (Cl. 74—459)

This invention relates to recirculating ball bearing screw and nut mechanisms for changing rotary to linear, or linear to rotary, motion by means of rolling balls. The invention also relates to methods of eliminating end play or backlash and effecting load dividing in such mechanisms.

This application is a division of my copending application Serial No. 91,545, filed February 24, 1961, now Patent No. 3,198,029, for Preloaded Ball Bearing Screw and Nut Mechanism, and directly related to a series of applications all having overlapping pendencies and including Serial No. 371,253, filed July 30, 1953, now abandoned; Serial No. 459,605, filed October 1, 1954, now Patent No. 2,895,343; and Serial No. 803,804, filed April 2, 1959.

The ball bearing screw and nut mechanisms as known heretofore consist of a screw and nut with balls distributed on the spiral race of the nut to carry a load by the rolling action of the balls. A return tube connecting the ends of the race in the nut serves to recirculate the balls back to the beginning of the race. This return tube complicates the mechanism and limits the functional and economical use of the device and this is particularly true where the return tube extends outside the confines of the nut body where it is subject to injury and failure by reason of interference or obstruction to the free circulation of the balls.

There are many mechanisms in which end play, that is, relative longitudinal shifting between the nut and the screw, may not be tolerated. This is particularly true in certain high load applications, such as in aircraft, where it is important that the balls and the groove walls correspond in curvature in order to minimize deformation of the balls due to the high stresses present.

An important feature of the invention is the provision made for assembling the principal components with precision and in such manner that all balls in the working portion of the ball circuits are loaded uniformly and to values known to a high degree of accuracy. These characteristics and features have long been sought but never before achieved except in a haphazard manner by laborious cut and try assembly procedures.

One of the primary objects of this invention is to provide an improved ball bearing screw and nut mechanism eliminating the return tube construction.

Another object of the invention is the provision of a ball bearing nut and screw mechanism having a plurality of similar nuts each held assembled to the screw by an independent closed circuit of balls and wherein said nuts are arranged to be rigidly locked against a predetermined position wherein it is known that the balls of each associated nut lying in juxtaposition to the screw will be loaded uniformly as an external load is applied to the mechanism.

Another object of the invention is the provision of a ball bearing nut and screw mechanism having a plurality of nut rings each having an independent closed circuit of recirculating balls which circuits are of figure-eight configuration and include a relatively large diameter loop of at least one full convolution of balls all in contact with the screw groove, and characterized in the provision of means for preloading all balls in contact with the screw to a predetermined value whereby such balls remain loaded independently of the presence of external loads acting on the mechanism.

Another object of this invention is to provide a ball bearing screw and nut mechanism incorporating individual circulating systems assembled into a nut in such a way as to control the distribution of the loads on the balls, and to provide a method of effecting such assembly.

Another object of the invention is to provide a highly simple and economical nut means incorporating devices for causing the ball race to take the form of a figure eight.

Another object of this invention is to provide a ball bearing screw and nut mechanism employing single-turn recirculating paths for higher loading and better efficiency.

Another object of this invention is to provide a ball bearing screw and nut mechanism incorporating individual circulating systems assembled into a nut in such a way as to eliminate end play, and to provide a method of effecting such assembly.

Another object of this invention is to provide a ball bearing screw and nut mechanism that automatically spaces the balls on the spiral race of the nut to eliminate the rubbing friction between the balls.

Another object of this invention is to provide a ball bearing screw and nut mechanism of economical construction.

Another object of this invention is to provide a ball bearing screw and nut mechanism incorporating separate and individual circulating systems assembled into a single articulate nut structure.

Other objects and advantages will become more fully apparent as reference is had to the accompanying drawings wherein my invention is illustrated and in which:

FIGURE 1 is a general view illustrating one preferred embodiment of my invention;

FIGURE 2 is a cross-sectional view taken through the screw and showing the nuts being preloaded;

FIGURE 3 is a top plan view of FIGURE 2;

FIGURE 4 is an enlarged fragmentary sectional view taken on the plane 4—4 of FIGURE 1;

FIGURE 5 is a fragmentary cross-sectional view on an enlarged scale taken along line 5—5 on FIGURE 3;

FIGURE 6 is an enlarged fragmentary view taken on line 6—6 on FIGURE 5;

FIGURES 7 and 8 are end and side elevational views, respectively, of the ball return means; and FIGURE 9 is a schematic view looking axially of the nut ring but showing only the balls in their normal operating figure-eight configuration.

Referring to FIGURES 1 to 8, inclusive, and particularly to FIGURE 1, there is shown a ball bearing screw 1 supported rotatably in bearings 2 and 3 mounted in a housing 4. A gear 5 fixed to the screw 1 is driven by gear 6 on a motor 7. This illustrates a rotary source of power to actuate screw 1. The ball bearing nut assembly 8 may be used to actuate an aircraft landing gear, or any mechanism that requires movement axially of screw 1. It is also feasible to rotate nut assembly 8 by a source of power and thereby shift screw 1 linearly in either direction. It is also feasible to actuate either the nut or the screw by a linear source of power and derive rotary motion from the other member.

Nut assembly 8 as here shown by way of illustration in its simplest form comprises a pair of identical nut rings 14 each having a helical ball groove 15 having the same contour and lead or pitch as helical ball groove 16 of screw 1. Grooves 15 of each nut ring are preferably sufficiently long to provide at least one complete turn between its points of communication with the opposite ends of a ball return loop or recirculating passage 17. This passage is here shown as formed partly by an internal surface of nuts 14 and in part by a ball return insert 22 to be described in detail presently. The opposite end portions of the load groove preferably overlap to assure uniform distribution of the applied load throughout the entire circumference of both the screw and of the nut rings.

The helical ball groove 15 and recirculating groove 17 of each nut ring 14 are nearly filled with balls 18. The balls 18 mate with the helical ball groove 16 of the screw and helical ball groove 15 of the nut in such manner that any rotary motion of the screw 1 or nut ring 14 will actuate the other member linearly by the rolling action of the balls. The rolling action of the balls transmits force with a smaller coefficient of friction than the rubbing action of conventional nut and screw threads. It is preferred that grooves 15 and 16 have rounded or arcuate bottoms corresponding to but of larger radius than balls 18, as is made clear by FIGURE 4.

The overlapped ends of the load ball grooves are positioned opposite a generally semicylindrical bore 21 formed in each nut ring and extending from face to face of the nut ring. Bore 21 serves to receive a ball return insert 22 (FIGURES 7 and 8) employed to transfer the balls 18 from one end of the load groove to the other end thereof and forming the small diameter ball return loop portion of the ball circuit. Insert 22 may be secured in nut ring 14 by any suitable means such as by welding, or by use of a pin 23 in the manner shown in FIGURE 6. This insert may be formed from metal or plastic by use of die casting, injection molding, powdered metal or other techniques.

According to the present invention, insert 22 is so constructed that balls 18 reverse direction two times in a smooth curve and form a small diameter return loop merging with the ends of the large diameter load groove loop thereby providing a complete ball race having a figure-eight configuration as is best illustrated in FIGURE 9. More specifically, insert 22 is constructed with a generally semi-cylindrical body 25 corresponding in size to bore 21 and includes depending ears 26 and 27 formed one at each end portion of body 25 and on the opposite sides thereof. The ears 26 and 27 depend into screw groove 16 and screw 1 and serve as guides for the smooth and efficient transfer of balls 18 between the large diameter load grooves 15, 16 and the relatively small diameter ball return loop 17.

The loop-shaped passage through insert 22 comprises a groove 17 extending generally diagonally or obliquely to the longitudinal axis of insert body 25, as viewed in FIGURES 6 and 8, and terminates at the ends of ears 26 and 27. Groove 17 opens outwardly along the outer side of the semicylindrical wall of insert body 25 so that balls 18 actually roll along the corresponding semicylindrical wall of bore 21 in nut ring 14, but is separate from the screw thread crest by a transverse bridge 29 (FIGURE 6), this bridge serving to complete the ball return loop 17 and to maintain the balls out of contact with the crest of the screw thread. As is best illustrated in FIGURES 7 and 8, ears 26 and 27 are formed, respectively, with faces 31 and 32 which are so curved as to have the same radius and center as the wall of nut bore 21 so that these faces 31 and 32 are in perfect cylindrical or curvilinear continuity with the bore wall. In order to provide for the continuity the ears 26 and 27 are recessed back into the nut body and protrude outwardly in opposite directions from insert body 25, as is best illustrated in FIGURE 8.

To facilitate preloading adjustment each nut ring 14 includes a plurality of transverse passages or keyways 45 distributed about the circumference thereof for frictionally seating and retaining a locking key 49 seated partially in the aligned passages of adjacent nut rings when the latter are rotated into abutting relation and to the extent required to preload balls 18 of each ball circuit to a desired predetermined value. Once the balls have been preloaded to this value and the nut rings have been rigidly locked by key 49 against rotation in either direction relative to one another, it will be recognized that there is provided a permanent precision nut assembly 8 capable of carrying a predetermined external load without risk of error in the ball and screw mechanism due to deformation of the balls under the applied load, provided, of course, that the preload acting on the balls is not in excess of the external design load.

It is also pointed out that, desirably, there is inserted between each pair of adjacent nut rings (if more than one pair is employed as the invention contemplates) shim means 48 selected to have the precise thickness found necessary to hold the nut rings accurately and rigidly spaced with all balls in contact with screw 1 preloaded to the desired load values with at least one pair of keyway passages 45 accurately aligned. As will be recognized, one shim thickness may be too thin and another too thick to provide for rigid and firm lock-up of the nuts against the faces of shim means sandwiched therebetween as a pair of keyway passages are rotated into alignment. However, a shim of properly selected intermediate thickness will provide these desired results in accordance with the principles of this invention. If the shim means have an outer diameter lying inwardly of the bottoms of keyways 45 as shown in FIGURE 4, the shims do not project into or obstruct the keyways.

To assemble the ball bearing nut and screw mechanism, the workman runs the nut rings into abutment along screw 1 and applies a pair of spanner wrenches 47, 47' to these nuts, in the manner shown in FIGURES 2 and 3, preferably with the wrench handles extending horizontally from the opposite sides of the nuts as illustrated, the lugs 46, 46' of the respective wrenches being engaged in a keyway 45 of a different nut and being operable in known manner to rotate the two nuts together along screw 1. Identical predetermined weights W, W are then applied to the outer ends of the two wrenches to rotate them in opposite directions. If the two nut rings are so dimensioned that a pair of keyways 45 are aligned as the adjacent faces of the rings contact one another firmly and with the balls 18 in screw groove 16 sharing substantially the full load of the weights W, then the nuts may be rigidly locked together with assurance that the balls are preloaded to known uniform values. If it happens that a pair of keyways are not in alignment under the applied loads W, or that the nut ring faces do not firmly contact as the balls assume the load imposed by these weights, or that the rings are slightly oversize in a manner preventing the balls from carrying the load forces imposed by the weights acting through the wrenches, the workman inserts shims 48 of the requisite thickness or lap grinds the oversize rings as necessary to correct the deficiency.

The next important step is to lock the two rings in preloaded condition by inserting a rigid key 49 in and bridging the adjacent ends of aligned passages 45, 45. These are secured in place in any suitable manner as by a frictional fit with the walls of the passages and desirably are so dimensioned as not to protrude from the passages 45 as best appears from FIGURE 4. This having been done, the spanner wrenches may be removed.

When the nut rings are preloaded according to the technique just described they remain permanently stressed irrespective of the presence or absence of an external load. Also, as will be recognized from FIGURE 4, balls 18 of an associated pair of nut rings 14, 14 are loaded along diametric axes through the balls and inclined oppositely to one another and to the longitudinal axis of screw 1 as is indicated by the dot-and-dash lines in FIGURE 4. Although only one pair of nut rings has been shown as preloaded in this manner in the drawing, it will be understood that additional pairs of similar nut rings can be similarly assembled and preloaded one pair at a time against the remotely spaced ends of previously preloaded nut rings.

In the operation of the described illustrative embodiment of the invention, let it be assumed that the components of the ball bearing nut and screw mechanism have been assembled to place nut rings 14, 14 under compression axially of the mechanism with all of balls 18 actually in the large diameter load groove of each of the independent ball circuits under predetermined, uniformly distributed preload stress independently of external load conditions. Assuming now that screw 1 is rotated counterclockwise relative to nut assembly 8 as viewed in FIGURE 1, the balls in the large diameter load groove formed by the mating grooves of the screw and the nut rings will roll counterclockwise relative to nut rings 14 until the balls engage faces 31 of ears 26. The balls then roll upwardly along faces 31 in a smooth curve and onto the wall of bore or channel 21, these surfaces being in true curvilinear continuity due to the fact that face 31 lies on the interior surface of the same hypothetical cylinder, extending longitudinally of the screw, as the bore wall. Balls 18 then loop backwardly and outwardly through passage 17 between the overlapped ends of the large diameter single turn load groove loop or convolution. The balls are thus guided by the wall of passage 17, by the side walls of the insert body 25, and by the upper rounded wall of bridge 29 until they roll onto face 32 of ear 27 and thus back into the load groove.

It is to be noted that the balls in rolling upwardly on face 31 and into passage 17 reverse direction and are guided back over a screw thread crest in the small diameter ball return loop portion of the figure-eight race, after which the balls again reverse direction and roll downwardly onto face 32 of ear 27 and back into the single turn load groove convolution between the screw and the nut ring. There is absolutely no break in the continuity of the walls over which the balls 18 are guided, and there are no sharp points or friction generators in the entire figure-eight race. The balls thus move through the entire race in extremely frictionless manner so that the efficiency of the screw and nut mechanism is greatly increased as compared to former structures in which the balls do not roll in a figure-eight but instead merely make a generally right angle turn over the screw thread crest. In circulating through the described closed loop circuits, it is pointed out that all balls within the main load groove of at least one full convolution of the screw are always maintained preloaded and elastically deformed by the preload forces with the result that each nut ring carries a full share of the applied load which share is distributed uniformly between all balls in the load groove.

While the particular preloaded ball bearing screw and nut mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A ball bearing nut and screw mechanism the nut components of which have been rotatably adjusted relative to one another to remove looseness between the parts and thereafter further rotated to place the load-bearing contacting surfaces under elastic deformation thereby to remove additional sources of looseness between the parts which would otherwise be created as said mechanism is placed under load and substantially reducing if not eliminating this additional source of play between the components; said mechanism comprising a helically grooved screw; a plurality of continuous nut ring means encircling said screw and having internal helical grooves of the same pitch as said screw groove; said nut ring means being provided with independent ball return passages the opposite ends of which communicate smoothly with the opposite ends of the helical grooves in said nut ring means at circumferentially spaced points therealong; said ball return passages and the associated intervening portion of said helical groove providing a circuit for a substantially uniformly distributed endless circuit of balls present therein; means for rotating said nut ring means relative to one another and into axial abutment to preload and elastically deform all balls in contact with said screw and the areas of said helical grooves in contact therewith thereby to preload said mechanism by forces confined to said nut ring means, to said balls and to said screw and leaving said nut ring means free to rotate as a unit in either direction about the axis of said screw; passage means extending transversely across said preloaded nut ring means and arranged to be misaligned when said nut rings are rotated sufficiently to remove backlash and to be in axial alignment when said nut ring means are rotated further and until said balls and nut rings are preloaded to a desired predetermined load value; and rigid keeper means extending through and secured within said aligned passages for holding said preloaded nut ring means rigidly locked preloaded and against rotation in either direction relative to one another.

2. A ball bearing nut and screw mechanism as defined in claim 1 characterized in that said nut ring means includes shim means sandwiched between the juxtaposed ends thereof and having that thickness required to hold adjacent nut rings rigidly spaced apart under compression forces acting transversely of said shim means and indicative of the desired predetermined preload forces acting diametrically of the balls in contact with said screw when said keeper seating passages are in alignment with one another.

3. A ball bearing nut and screw mechanism as defined in claim 1 characterized in that said nut ring means include means on the exposed exterior surfaces thereof for seating rotary force applying means to said nut rings while rotating the same relative to one another to adjust the preload forces acting between the components of said mechanism.

4. A ball bearing nut and screw mechanism preadjusted and preloaded during assembly to elastically deform portions of its load bearing components to a substantial degree simulating the deformation producible by the externally applied load forces of its intended operating environment whereby said mechanism is substantially immune to errors unavoidable if the load forces were to be applied to said mechanism in nonpreloaded condition; said mechanism comprising a plurality of nut ring means each held assembled to a helically grooved screw by an independent circuit of recirculating balls held captive between each nut ring and said screw and including a ball return passage means on the nut ring and having its opposite ends in smooth communication with points of said screw groove spaced at least one convolution apart; said nut ring means having keeper seating passages extending thereacross to seat rigid keeper means when said ring means are rotated relative to one another to align said keeper seating passages and to force the adjacent ends of the nut rings together under a predetermined axial pressure; said predetermined axial pressure being the reaction force indicative of a predetermined preload pressure acting diametrically of balls of each nut ring in contact with said screw and effective to elastically deform said balls and portions of said screw and nut rings in load contact therewith similarly to the deformation producible by the externally applied load forces acting on said mechanism in its operating environment; means free of friction losses arising from therewithin for applying opposed rotation forces of known value to said nut rings thereby to rotate said nut rings axially together to preload said mechanism to a known predetermined value with said keeper seating passages in alignment; and rigid keeper means extending along said aligned passages and transversely of a plurality of said nut rings to lock the same assembled in preloaded condition with all nut rings free to rotate in unison and as a unit in either direction about the axis of said screw.

5. A ball bearing nut and screw mechanism as defined in claim 4 characterized in that said rigid keeper means is located interiorly of the exterior surfaces of said nut ring unit.

6. A ball bearing nut and screw mechanism as defined in claim 4 characterized in that each of said nut rings is provided with a plurality of said keeper seating passages distributed circumferentially thereof and any aligned group of which may be used to lock said nut rings rotated to a desired preloaded condition by inserting a rigid keeper therein.

7. A ball bearing nut and screw mechanism as defined in claim 4 characterized in that said nut rings are provided with preloading lever-seating means accessible about the periphery of said nut rings and by which a rotary preloading force of accurately predetermined value can be applied and used to rotate adjacent nut rings against one another with assurance that any force applied to a lever seated therein will be transmitted to said nut rings without loss and effective to preload the defined components of said mechanism.

8. A ball bearing nut and screw mechanism preadjusted and preloaded during the assembly of its components to elastically deform portions of its load bearing components to a substantial degree simulating the deformation producible by the externally applied load forces of its intended operating environment whereby said mechanism is substantially immune to errors unavoidable if the load forces were to be applied to said mechanism in nonpreloaded condition; said mechanism comprising a plurality of substantially identical nut rings each held assembled to a helically grooved screw by an independent circuit of recirculating balls held captive between each nut ring and said screw and including a ball return passage means on the nut ring and having its opposite ends in smooth communication with points of said screw groove spaced at least one convolution apart; shim means positioned between the adjacent ends of said nut rings; said nut rings having keeper seating passages extending thereacross to seat rigid keeper means; said keeper seating passages being misaligned until said nut rings have been rotated relative to one another sufficiently to force their adjacent ends against the opposite sides of said shim means under a predetermined axial pressure; said predetermined axial pressure being the reaction force indicative of a predetermined preload pressure acting diametrically of balls of each nut ring in contact with said screw and effective to elastically deform said balls and portions of said screw and nut rings in load contact therewith similarly to the deformation producible by the externally applied load forces acting on said mechanism in its operating environment; means free of friction losses arising from therewithin for applying opposed rotation forces of known value to said nut rings thereby to rotate said nut rings axially together to preload said mechanism to a known predetermined value with said keeper seating passages in alignment; and rigid keeper means having a length not greater than the axial length of said aligned passages extending along said aligned passages and transversely of said shim means to lock said nut rings assembled in preloaded condition with said locked nut rings free to rotate in unison and as a unit in either direction about the axis of said screw.

9. A ball bearing nut and screw mechanism as defined in claim 8 characterized in that the combined length of said nuts in preloaded locked condition and including the rigid keeper means for holding said nuts preloaded is not in excess of the axial distance between the remotely spaced ends of the nut ring assembly.

10. A preloaded ball bearing screw mechanism having its load bearing components elastically deformed sufficiently as to be unaffected by the application of normal external loading, said mechanism comprising two nut ring means with internal helical load grooves, a screw having an external load groove of the same pitch as said nut rings, a plurality of balls in each nut forming independent circuits of recirculating balls held captive between the load grooves of each nut ring means and said screw and including in each said nut ring means ball return means to recirculate said balls in a continuous path by the relative rotation of said screw and nut ring means, said nut ring means being rotatable toward each other by temporarily applied oppositely acting torque forces of predetermined value, all of said predetermined value forces being utilizable without any material loss to elastically deform and preload said screw, the balls in the respective ones of said nut rings being elastically stressed in compressive strain by said torque forces along diametric axes oppositely inclined to one another and to the axis of said screw thereby placing the portion of said screw between said ball circuits in elastic tensile strain, and locking means disassociated with the means for placing said mechanism under preload to lock the same rigidly in preloaded condition.

11. A ball bearing nut and screw mechanism the nut components of which have been rotatably adjusted relative to one another to remove looseness between the parts and thereafter further rotated to place the load-bearing contacting surfaces under elastic deformation thereby to remove additional sources of looseness between the parts which would otherwise be created as said mechanism is placed under load and substantially reducing if not eliminating this additional source of play between the components; said mechanism comprising a helically grooved screw; a plurality of continuous nut ring means encircling said screw having internal helical grooves of the same pitch as said screw groove; said nut ring means being provided with independent ball return passages the opposite ends of which communicate smoothly with the opposite ends of the helical grooves in said nut ring means at circumferentially spaced points therealong; said ball return passages and the associated intervening portion of said helical groove providing a circuit for a substantially uniformly distributed endless circuit of balls present therein; means for applying a predetermined torque force without loss directly to said nut ring means to rotate the same together under compressive stress and to elastically deform said balls and said grooves in diametrically opposed areas of said balls; and rigid means structurally independent of said means for applying a predetermined torque force to said nut rings and cooperating with said nut ring means to lock said nut ring means and said balls positively in elastically deformed preloaded condition with said nut rings and screw free to rotate relative to one another in either direction.

12. A ball bearing nut and screw mechanism the nut components of which have been rotatably adjusted relative to one another to remove looseness between the parts and thereafter further rotated to place the load-bearing contacting surfaces under elastic deformation thereby to remove additional sources of looseness between the parts which would otherwise be created as said mechanism is placed under load and substantially reducing if not eliminating this additional source of play between the components; said mechanism comprising a helically grooved screw; a plurality of continuous nut ring means encircling said screw having internal helical grooves of the same pitch as said screw groove; said nut ring means being provided with independent ball return passages the opposite ends of which communicate smoothly with the opposite ends of the helical grooves in said nut ring means at circumferentially spaced points therealong; said ball return passages and the associated intervening portion of said helical groove providing a circuit for a substantially uniformly distributed endless circuit of balls present therein; means on said nut ring means adapted to seat readily detachable torque applying means to said nut rings temporarily while preloading the same and by which said nut rings are relatively rotatable toward one another by readily ascertained torque forces free of losses thereby to place the bodies of said nut ring means under axially acting compressive load and to preload said mechanism by elastically deforming said nut ring means and screw grooves and the balls in contact therewith to a degree approximating the deformation producible by the application of an external load to said mechanism; means structurally disassociated with and spaced from the means used to preload said mechanism for locking said nut rings against reverse rotation to diminish the preloaded condition thereof and adapted to be installed between said preloaded nut ring means while the same are held forcibly and steadily in preloaded position; and said torque applying means being detachable after said locking means has been installed.

13. A preloaded ball bearing nut and screw mechanism as defined in claim 11 characterized in that said torque applying means are adapted to be applied against one peripheral side of said nut ring means and to project radially therefrom, and in that the diametrically opposed side of said nut rings is left free and unobstructed, and said locking means being installable from the last mentioned side of said nut ring means.

References Cited by the Examiner

UNITED STATES PATENTS

| | | | |
|---|---|---|---|
| 2,473,743 | 6/1949 | Barnes | 74—459 |
| 2,519,777 | 8/1950 | Cochrane | 74—459 |
| 2,618,166 | 11/1952 | Douglas | 74—459 |

FOREIGN PATENTS 920,649  3/1963  Great Britain.

DON A. WAITE, *Primary Examiner.*